Dec. 7, 1954  H. W. SCHUMANN  2,696,569
MOTOR TOOL
Filed Feb. 13, 1952  2 Sheets-Sheet 2
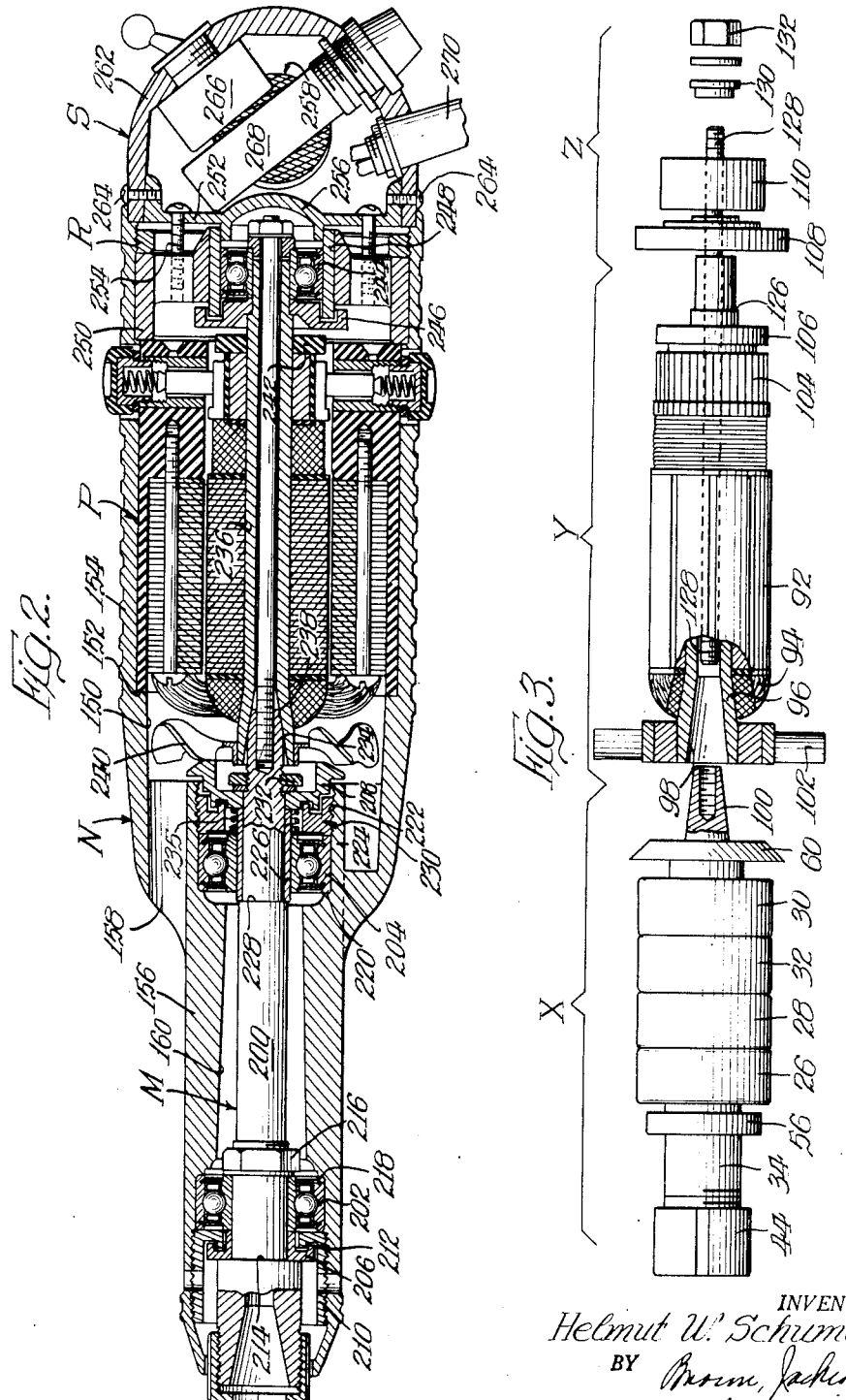
INVENTOR.
Helmut W. Schumann
BY
Attys.

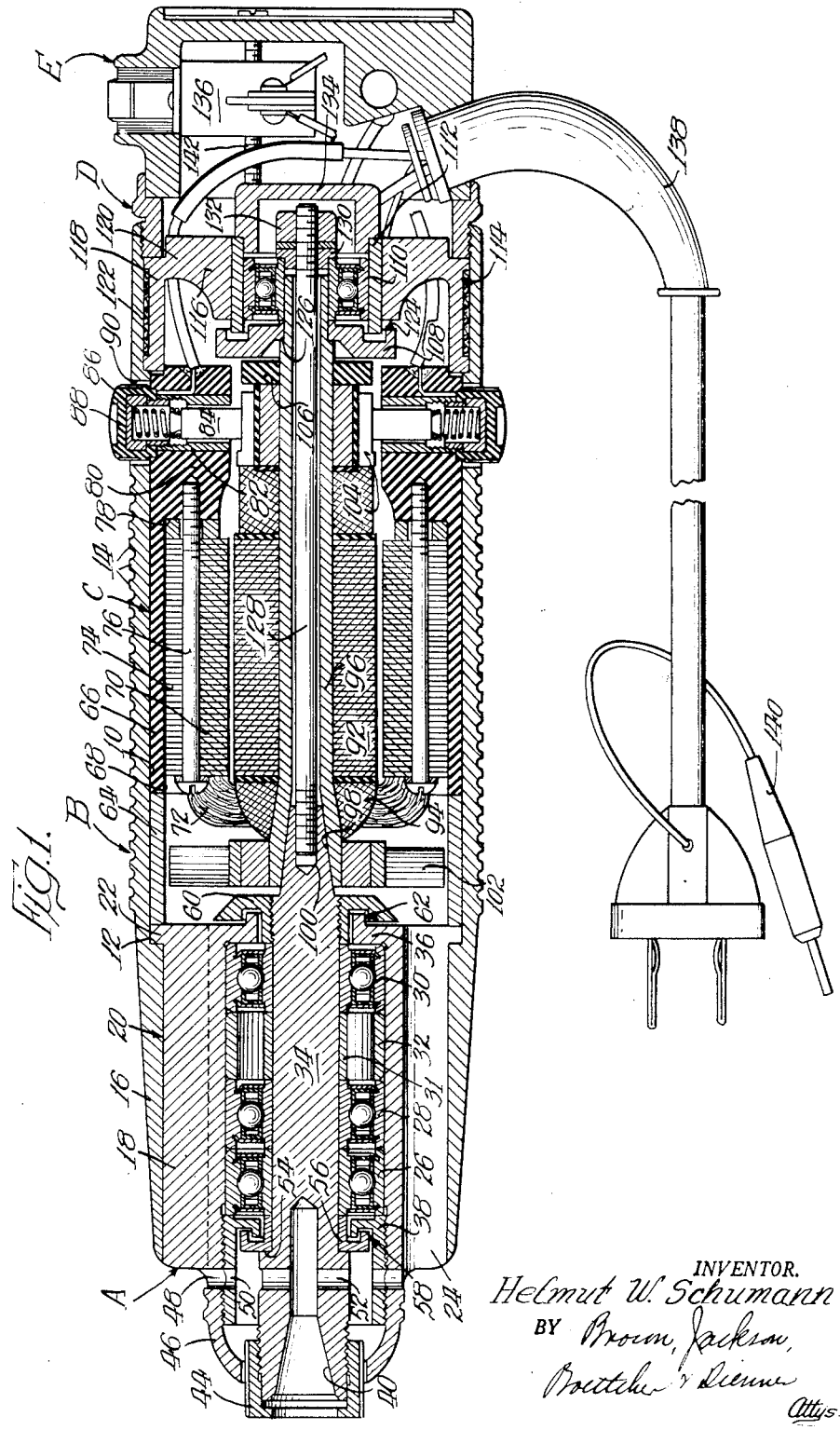

United States Patent Office 2,696,569
Patented Dec. 7, 1954

2,696,569

MOTOR TOOL

Helmut W. Schumann, Racine, Wis.

Application February 13, 1952, Serial No. 271,302

11 Claims. (Cl. 310—50)

The present invention relates to electric motor tools and particularly to improvements in the tool disclosed in my Patent No. 2,532,823, issued December 5, 1950.

Tools of the general character referred to may be held and guided by the hand of the operator, or they may be fixed in a stationary mount to have the work brought to the tip or bit, or they may be mounted in the machine that guides the tip or bit relative to the work, or vice-versa. Tools of this character employing grinding wheels, tungsten carbide bits, or other hard duty cutting or abrading bits, are now frequently employed in machines which advance the tool relative to the work by a lead screw or other machine feed. For this purpose, the motor may, by way of example, operate at speeds of the order of 15,000 to 45,000 R. P. M., with a power output of the order of one-fifth to three-quarters of a horsepower.

To meet the requirements of the art, it is necessary, in tools of the character defined, to satisfy a number of strongly conflicting requirements. The tool must have ample strength to stand up under rugged handling and the stresses of clamping in a machine rest with power feeding into the work. The accuracy of alignment of the parts must be continuously maintained. The dimensions and weight must be held to those which are convenient to hand operation or simple installation into existing machine tools. At the same time, ample power to perform the cutting, grinding and other operations must be incorporated in the tool. Yet, the tool must not be allowed to grow hot in the hands of the workman, or to expose anyone to the danger of electric shock.

To construct a tool of this character which will stand up under severe use requires extraordinary accuracy and care in construction and assembly. The parts must be accurately balanced and said accuracy in balance must be maintained under the adverse conditions to which such tools are subjected.

A tool of this type is a toolroom or production tool. That is, its normal function is the performance of an essential toolroom or production operation. Stoppage of its operation, as by burning out a coil, requires immediate repair or replacement, otherwise the tool operator is idle. The natural desire of the operator is to open the tool and replace the armature or other part or parts which have resulted in stoppage of the tool. With a tool operating at such high speeds (about 45,000 R. P. M.), dynamic balance is an essential requirement, and to allow the workman to open up and replace indiscriminately the parts which are involved in such high speed operation would be undesirable, because of the likelihood of unbalance being introduced. If unbalance occurs, the tool will not operate satisfactorily and will vibrate and tend to do unacceptable work. The vibrations may be so severe as to render the tool useless and, in many cases, to cause the tool to destroy itself.

I have conceived the possibility of constructing a tool of the general character defined utilizing a renewable unitary motor cartridge which is carefully balanced at the factory. A spare cartridge may be delivered to the user of the tool in convenient form for substitution as a unit for a burned-out motor unit. This carefully balanced unitary motor cartridge may then be substituted for a burned-out motor without disturbing the accuracy of balance of the motor part or of the tool as a whole.

The provision of renewable unitary motor cartridges has been disclosed in my prior patent and, according to the patent, the tool is constructed of a number of sub-assemblies, so organized as to provide a strong and substantially unitary metallic frame and housing, to one end of which may be assembled, by telescopic engagement, a quill assembly consisting of a quill housing and the contained quill and its bearings, the quill having a coupling at one end thereof and a chuck at the free end thereof, a unitary motor cartridge assembly, and a switch and terminal housing assembly. The main metallic housing provides a strong frame by means of which the motor assembly and the quill assembly may be readily brought into accurate alignment, and they may be disassembled without disturbing the accurately balanced parts and their bearings. The resulting structure is exceptionally strong and durable and yet highly compact. The replacement of an assembly may be effected rapidly and conveniently without throwing out of balance the machine, which, so far as balance goes, is of very delicate character.

According to my prior patent, the motor assembly is in the form of a cartridge which is insertable or removable readily from the main housing without disturbance of the delicately balanced rotating quill assembly parts and includes a delicately balanced armature assembly adapted to be connected to the quill assembly by means of an elastic coupling which has ample capacity to take up any minor inaccuracy in alignment of the armature assembly and the quill assembly which might occur in the replacement of either or both of these parts by the user.

While the elastic coupling between the motor shaft and the quill, as disclosed in my prior patent, has proven satisfactory in use, the coupling is not capable of aligning the two shafts and is required to take up minor inaccuracies in alignment of the two shafts. In other words, the quill is supported for rotation by one set of bearings and the motor armature shaft is supported for rotation by a second set of bearings and the elastic coupling merely connects the two shafts. If the shafts are accurately aligned, the elastic coupling only serves to connect the shafts and its operation and useful life are good. If, however, the two shafts are slightly out of alignment, the coupling is required to flex or yield to take up the eccentricity of the shafts. At 45,000 R. P. M., the flexure of the coupling is rapid and severe and the useful life of the coupling is vastly reduced. Further, since the quill and motor shaft are each supported by a bearing adjacent the coupling, the coupling is required to elastically yield to take up inaccuracies in alignment in a short space, which increases the flexure and rapidity of wear of the coupling. In addition, and particularly in milling operations, the elastic coupling tends to introduce a chatter in the tool due to the alternate loading and unloading of the rubber cushion as is normally occasioned by the action of the milling teeth or by similar torque variations upon the coupling.

An object of the present invention is to provide improved coupling means for positively connecting the two shafts for conjoint rotation as a unit to avoid the disadvantages of flexible couplings.

Another object of the present invention is to provide a quill assembly including a shaft, a motor armature assembly including a shaft, and interengaging portions on the adjacent ends of said shafts for effecting a positive engagement therebetween.

A further object of the invention is the provision of improved coupling means for positively connecting the two shafts in accurately aligned relation so that the possibility of eccentricity between the shafts is obviated.

A still further object of the invention is the provision of improved coupling means of a solid or non-yieldable type that automatically effects and necessitates accurate alignment of the two shafts, so that same are positively connected for unitary rotation about a common axis.

In accordance with the present invention, I provide a socket, preferably a tapered or frusto-conical counterbore, at the end of one shaft adjacent the other shaft, and I provide the other shaft with a head portion, preferably a tapered or frusto-conical surface, at the end thereof adjacent the one shaft adapted to be inserted and releasably secured in the socket in the one shaft, whereby the two shafts are locked together by the engaging surfaces of the socket and the head for conjoint rotation.

As stated, the engaging portions of the shafts are preferably tapered or frusto-conical so that same may be brought into intimate engagement to automatically effect and necessitate accurate axial alignment of the shafts. Since the quill and armature assemblies are delicately balanced dynamically, the entire rotating elements of the motor tool, considered as a unit, will be delicately balanced and accurately aligned so that the tool may be efficiently operated at high speeds, such as the exemplary speed of 45,000 R. P. M., without danger of wear to the coupling or the bearings supporting the quill and motor shaft.

The frusto-conical portions of the quill and armature shafts further provide for the firm and accurate support of the adjacent ends of the shafts, so that one definite advantage of the present invention is the obviation of any necessity for bearings supporting the coupling end of one of the shafts. For example, the bearing supporting the coupling end of the quill shaft, due to the rigid connection of the shafts, may also support the coupling end of the armature shaft to obviate the need for a supporting bearing at that end of the armature shaft. In tools of the character described, the bearings for the tool are a high cost factor, since same must be extremely accurate, and the removal of even one bearing provides a substantial reduction in the cost of the tool.

Another object of the present invention is to accommodate relative axial movement between the motor and quill shafts and the tool casing to take up the expansion and contraction of the shafts, due to the heating effect of the heavily loaded armature of the tool, to prevent lateral deflection of the shafts and axial overload on the tool bearings. This provision may be accomplished by utilizing at least one of the quill bearings to hold the quill and armature shaft against endwise play and by mounting at least the bearing supporting the rear end of the armature shaft for axial floating movement with respect to the shaft or the casing.

Still another object of the present invention is to provide improved coupling means of the character defined including means for detachably or releasably connecting the two shafts, so that the shafts may be readily separated to facilitate repair of the tool and accommodate replacement of the two main assemblies thereof.

In a preferred embodiment of the present invention, I provide a quill assembly including a shaft having a tapered or frusto-conical surface at the end thereof adjacent the motor armature, a motor armature including a hollow shaft having a tapered or frusto-conical counterbore at the end thereof adjacent the quill assembly adapted for the reception of and intimate engagement with the frusto-conical end of the quill shaft, and connecting means extending through the hollow armature shaft to secure the two shafts together.

The provision of means for connecting the quill assembly and motor assembly extending through the hollow armature shaft insures positive association of the two armature assemblies so that same are, through the cooperation of the connecting means and the frusto-conical portions of the armature shaft and the quill, locked together as a unit when assembled. In addition, the provision of connecting means as stated provides for extension of the means axially of the rotating parts so that any slight possible unbalance of the connecting means will not effect the delicate balance of the rotary elements of the quill assembly and motor armature assembly and so that the connection may be effected at a point remote from the frusto-conical portions of the shafts, which point is readily accessible.

A further object of the present invention is the provision of improved centrifugal seals for preventing entry of air, passing through the casing under forced ventilation, into the bearings supporting the quill and the armature shaft.

Other objects of the present invention include the provision of motor tools utilizing the coupling means of the present invention, the provision of motor tools of the general character defined hereinbefore having all the advantages of the tool described in my prior patent and, in addition, having improved coupling means, and the provision of improved motor tools of the character defined that are economical of manufacture and assembly and may be readily and conveniently repaired.

Still further objects and advantages of the present invention will become apparent in the following detailed description of preferred embodiments of the invention, wherein reference is made to the accompanying drawings, in which:

Figure 1 is a cross-sectional view of one embodiment of the improved motor tool of the present invention including the improved coupling means of the present invention;

Figure 2 is a cross-sectional view of a second embodiment of the improved motor tool of the present invention including the improved coupling means of the present invention; and Figure 3 is an exploded view, in side elevation, of the quill assembly, the armature assembly and the connecting means of the embodiment of the motor tool shown in Figure 1, portions of the quill assembly and the armature assembly being broken away to disclose the improved coupling of the present invention in cross section.

In the embodiment of my invention shown in Figure 1, the main parts or assemblies of the motor tool comprise the quill assembly A, a main housing B, a motor cartridge C, which is adapted to be telescoped inside the housing B, a locking ring D and a switch housing assembly E.

The main housing element B is preferably a metal casting having a main cylindrical bore 10 terminating in a shoulder 12 which serves as a stop for the location of the quill assembly A and the motor cartridge C. The housing B is preferably formed of steel so that the same will impart a high degree of rigidity to the tool. The outside surface of the housing may be provided with corrugations consisting of spaced groups of circumferential beads or rings, as at 14, disposed at suitable portions of the outside surface of the housing for convenience in gripping the tool and for facilitating the dissipation of heat. The main housing B is provided with a neck portion 16 adapted for the reception of the cylindrical shank 18 of a quill housing 20. The shank 18 of the quill housing fits closely within the neck 16 of the main housing B and is provided with an outwardly extending radial flange 22 at one end thereof adapted to abut against the shoulder 12 in the housing B to properly locate the quill housing within the main housing. The quill housing 20 is provided adjacent the periphery thereof with a plurality of longitudinal slots or bores 24 which extend through the quill housing and establish communication between atmosphere and the bore 10 in the main housing B. The quill housing 20 is provided with an axial bore within which a plurality of anti-friction bearings are mounted, in this instance, a plurality of ball bearings 26, 28 and 30. A ring-like spacer 31 is disposed between the inner races of the bearings 28 and 30 and a second spacer 32, of larger diameter than the spacer 31, is disposed between the outer races of the same bearings. The outer races of the bearings engage the walls of the axial bore in the quill housing 20 and the inner races thereof are adapted for the reception and support of a quill 34. The outer race of the bearing 30 engages an inwardly extending radial flange 36 formed integrally with the quill housing and the outer race of the bearing 26 is engaged and clamped in place by a clamping ring 38 threaded into the open end of the quill housing 20. The outer end of the quill 34 may be shaped, as desired, for the reception of a collet, chuck or the like. As shown herein, the quill is provided with a conical internal seat 40 adapted for the reception of a collet, not shown, which may be contracted by being forced down the tapered seat 40 by means of a chuck nut 44. The open end of the quill housing 20 is covered by a chuck cap 46 which is readily removable on its thread for manipulation of the chuck nut 44. The quill 34 may be held against rotation by passing a pin or the like through aligned bores 48, 50 and 52 provided in the quill housing 20, the clamping ring 38 and the quill 34. It will be apparent, however, that the details of the collet are optional.

Adjacent its outer end, the quill 34 is stepped to provide a shoulder 54 against which an annular slinger 56 abuts. The slinger 56 and the clamping ring 38 are provided with oppositely disposed cooperating flange portions, indicated generally at 58, adapted to be interpositioned to form a centrifugal seal between the bearings 26, 28 and 30 and atmosphere. Adjacent its inner end, the quill 34 is externally threaded for the reception of a combined clamping ring and slinger 60. The slinger 60 and the quill housing 20, at the radial flange 36 thereof, are provided with oppositely disposed cooperating flange portions, indicated generally at 62, adapted to be interpositioned in the manner shown, to provide a centrifugal seal between the bearings 26, 28 and 30 and the bore 10 in the main housing B.

The quill assembly is accomplished by first inserting the bearings 26, 28 and 30 and the spacers 31 and 32 into the axial bore of the quill housing 20, in the manner indicated in Figure 1, until the outer race of the bearing 30 abuts against the flange 36 of the quill housing 20. Then, the clamping ring 38 is threaded into the axial bore in the quill housing 20 until the rear surface thereof abuts against the outer race of the bearing 26 to clamp the bearings within the quill housing. Thereafter, the slinger 56 is slid unto the quill 34 and the quill is slid into the inner races of the bearings and through the spacer 31 until the inner ring portion of the slinger abuts against the inner race of the bearing 26. Then, the slinger 60 is threaded onto the quill 34 until the inner ring portion thereof abuts against the inner race of the bearing 30. The slinger 56 may suitably be pressed fit on the quill 34 or may be rigidly clamped between the inner race of the bearing 26 and the shoulder 54 on the quill 34 by means of the combined clamping ring and annular slinger 60. The slinger 60 is tightened sufficiently on the quill 34 to form a unitary assembly of the quill 34, the slinger 56, the inner races of the bearings 26, 28 and 30, the spacer 31 and the slinger 60, the said unitary assembly being adapted for rotation with respect to the quill housing 20. As will be apparent, the bearings 26, 28 and 30 cooperate to hold the quill 34 against endwise play with respect to the housing 20. The bearings are preferably pre-stressed to completely avoid endwise play. The collet members may thereafter be suitably secured to the quill and to the quill housing in the manner indicated in Figure 1. When assembled, the cooperating portions 58 of the slinger 56 and the clamping ring 38 and the cooperating portions 62 of the slinger 60 and the flange 36 of the quill housing 20 will be relatively positioned in the manner shown in Figure 1 so that the said cooperating portions form centrifugal seals at either end of the bearings for a purpose to be pointed out hereinafter. After the assembly thereof, the quill assembly A may be suitably inserted in the main housing B, from the rear end thereof, until the radial flange 22 on the quill housing 20 abuts against the shoulder 12 in the main housing B.

Within the bore 10 in the main housing B, a spacer ring 64, engaging the walls of the bore 10, is confined between the quill assembly A and the motor cartridge C to properly locate the motor cartridge with respect to the quill assembly and the main housing. The motor cartridge C comprises an assembled, carefully balanced motor in which the magnetic field material, with its windings, and the brushes are supported in a shell 66 of insulation material. The shell 66 is preferably molded of a stable phenolic resin capable of withstanding relatively high temperatures. The shell 66 is provided with a main cylindrical bore 68 adapted for the reception of the magnetic field laminations 70 and the field windings 72 of the motor. Slots 74 are formed radially in the outer margins of the laminations 70 for the reception of clamping bolts 76 adapted to clamp the magnetic field structure against a radial shoulder 78 formed by two inwardly extending webs 80 which are formed integrally with the molded shell 66. The webs 80 are adapted for the reception of motor brushes and, accordingly, are provided with oppositely disposed radial bores within each of which a brush holder 82 is adapted to be press fit or molded in. Each brush holder 82 is adapted for the reception of a conventional brush 84 adapted to be moved into engagement with the motor armature commutator by means of a coil spring 86 suitably confined between the brush 84 and a cap 88 covered with insulating material and adapted to be threaded into the brush holder 82. To receive the brush caps 88 and to render the brushes 84 readily accessible from the exterior of the motor tool, the main housing B is provided with oppositely disposed radial holes 90.

The motor armature comprises the usual magnetic laminations 92 and their associated windings 94 mounted on and secured to a hollow armature shaft 96. The armature shaft 96 and the quill shaft 34 are adapted to be detachably connected to provide a unitary rotary assembly. To this end one of the shafts is provided with a socket 98 and the other is provided with a head portion 100 adapted to be inserted and secured within the socket. In accordance with the present invention, it is preferred that the armature shaft 96 be provided at the forward end thereof with the socket 98, which is preferably a tapered frusto-conical counterbore or portion, adapted for the reception of the head portion 100, which is preferably a tapered frusto-conical surface, formed at the end of the quill 34. The connection between the portions 98 and 100 and the armature shaft 96 and the quill 34 will be described in greater detail hereinafter. At the forward end of the armature shaft, a hub and fan assembly 102 is secured to the armature shaft for rotation therewith, the fan 102 being received within the portion of the housing B adjacent the spacer ring 64 when the motor tool is assembled. The fan assembly 102 may suitably comprise a light metal casting of the character shown, but castings of the general character, such as an alloy of aluminum, are subject to growth or creep when heated and rotated so that the possibility of the hub becoming loose on the armature shaft is existent. In view thereof, a preferred fan comprises a steel stamping, as will be described hereinafter with regard to the embodiment of the invention shown in Figure 2. To the rear of the laminations and windings of the armature, a commutator 104 is secured to the armature shaft 96 and is adapted to be engaged by the brushes 84. Immediately to the rear of the commutator 104, a balancing ring 106 is secured to, suitably by a press fit, the shaft 96. The balancing ring 106 is preferably formed of relatively soft material that may be readily cut so as to dynamically balance out the armature assembly. To the rear of the balancing ring 106, the armature shaft 96 is stepped to provide a shoulder 126 against which a rear slinger 108 is adapted to abut. To the rear of the slinger 108 and at the rear end of the armature shaft 96, the inner race of a ball bearing 110 is mounted on the shaft 96. The outer race of the ball bearing 110 is mounted within a sleve or ring 112 for free floating axial movement to accommodate axial movement of the armature shaft 96 with respect to the housing B. The sleeve 112 is received within a bearing support or block 114 which comprises an inner annular ring 116 and an outer annular ring 118, the rings 116 and 118 being interconnected by integral webs 120. The outer ring 118 of the bearing block 114 is provided with a peripheral groove adapted for the reception of a screen or mesh 122 and the main housing B and the outer ring 118 are suitably provided with aligned holes for the passage of air to the interior of the housing. The rear slinger 108 and the sleeves 112 are provided with cooperating flange portions, indicated generally at 124, adapted to provide a centrifugal seal for the bearing 110.

The motor armature assembly comprises a plurality of permanently mounted parts and a plurality of removable parts. The stationary portion of the assembly, including the hollow shaft 96, the laminations 92, the windings 94, the fan 102, the commutator 104 and the balancing ring 106 are adapted to be inserted into the housing until the head or tapered portion 100 of the quill 34 is received within the socket or tapered counterbore 98 in the hollow armature shaft 96. After insertion of the stationary portions of the armature assembly into the bore 10 of the housing B, the field structure of the motor may be slid into the housing, with the peripheral portions of the shell 66 engaging the peripheral wall of the bore 10 in the housing B, until the shell 66 abuts against the spacer ring 64. Thereafter, the holes 90 in the walls of the housing B are aligned with the brush holders 82 so that the brushes 84, the springs 86 and the brush caps 88 may be assembled within the brush holders 82. Then the slinger 108 is mounted on the shaft 96 to abut against the shoulder 126 and thereafter the assembly of the bearing 110, the sleeve 112, the bearing block 114 and the screen 122 is inserted into the housing. The bore 10 in the housing B is stepped to provide a shoulder against which the outer ring 118 of the bearing block 114 is adapted to abut.

After the assembly has been completed to the degree stated, the clamping ring D is threaded into the open end of the housing B to clamp the quill assembly A, the spacer ring 64, the shell 66 and its associated field structure, and the bearing block 114 in the housing B. Thereafter, the motor armature is preferably secured to the quill 34 by passing a stud 128 threaded at both ends through the hollow shaft 96 and threading same into a tapped axial bore provided in the quill 34. After the stud 128 has been threaded into the axial bore in the quill 34, a locating washer 130 is slid onto the rear end of the stud and into the inner race of the bearing 110. Thereafter, a nut 132 is threaded to the free end of the stud 128 to force the cooperating portions 98 and 100 of the shaft 96 and quill 34, respectively, into aligned and positively engaged relationship, as will be explained in greater detail hereinafter. At its rear end, the bearing 110 is suitably sealed by means of a cap 134 fitted into the sleeve 112.

The motor is then in condition for reception of the switch assembly E. The switch assembly E comprises a cup-shaped housing within which a switch 136, a fuse (not shown) and a flexible power cord or cable 138 are received. The connections between the flexible power cord 138, the motor armature, the motor field, the switch and the fuse are conventional in all respects and as partially shown in Figure 1. The flexible power cable 138 contains the electric supply conductors and, preferably, includes a grounding conductor 140 for grounding the metallic case of the main housing to prevent accidental shock to the tool operator. The switch assembly E may be suitably secured to the main housing B by means of a plurality of bolts 142 passing through the cap and into tapped bores provided in the webs 120 of the bearing block 114.

The operation of the device will be apparent from the foregoing description. In brief, the switching on of electric current to the motor causes the armature to rotate at speeds of the order of 45,000 R. P. M., or even higher. As the armature rotates, air is drawn by the fan 102 through the screened aligned apertures provided at the rear of the housing B and in the outer ring 118 of the bearing block 114 into the inside of the motor, bathing the commutator and the armature and the inside and part of the outside surfaces of the magnetic field structure with a flow of air which passes out through the discharge openings 24 provided in the quill housing 20.

The operation of the fan 102 at such high speeds tends to produce a plenum of air inside the housing between the fan and the ventilating discharge openings 24. In normal operation, without certain provisions of the present invention, air tends to be driven down into the quill bearings, which action is undesirable. I have discovered that I can exclude the air from said bearings by means of the centrifugal seals provided by the cooperating flange portions of the various slingers 58, 62 and 108. Accordingly, the slingers compel the plenum of air radially outside of the location of the bearings so that the air passes outwardly through the discharge ventilating openings 24 provided in the quill housing 20. This corrects a fault which has presented considerable difficulty in the past.

Rotation of the armature rotates the quill 34. To change or insert a tip or bit, a pin or the like may be suitably passed through the aligned openings in the quill 34, the clamping ring 38 and the quill housing 20 and, by means of a wrench, the chuck nut 17 may then be released or tightened to accommodate the removal and insertion and securement of bits within the collet.

The motor tool may be gripped and manipulated by hand, or it may be mounted in a stationary mounting which clamps or grips the cylindrical portion of the main casing. The tool may be used with machine tools provided with mechanical feed for advancing the tool against the work, or vice versa. It will be apparent that the tool of the present invention has a wide variety of uses. In manufacture and assembly, the quill assembly 20 is formed separately of the remainder of the tool and it is separately balanced dynamically so that same is a complete and delicately balanced unit in and of itself. Likewise, the armature assembly is separately formed and dynamically balanced so that it, in and of itself, comprises a balanced rotary unit. The armature assembly may be suitably balanced by drilling holes in the hub of the fan assembly 102 and by cutting off portions of the balancing ring 106. Accordingly, when the quill assembly and the armature assembly are united, they constitute a unitary rotary element for the tool of the present invention, the unitary element being delicately balanced and particularly adapted for rotation at high speeds. Disposition of the stud 128 axially of the rotary unit insures that the stud will not create unbalance of the unit. For the repair or replacement of any part, it is a simple matter to release the parts substantially in the reverse order of assembly, as above described. That is to say, by loosening the bolts 142, the switch housing assembly may be loosened and removed. The locking ring D may then be unscrewed and the brush covers 88, the brushes and their springs may be removed. After removal of the nut 132, the bearing 110 and the slinger 108, the field assembly of the motor may be readily removed. Since the nut 132 has been removed from the stud 128, the armature assembly may be readily removed from the housing B. If the assembly requiring repair or replacement is that of the motor, the replacement may be then readily accomplished by the insertion of the replacement motor cartridge formed exactly in accordance with the cartridge described hereinbefore. If, however, damage has occurred to the quill assembly, the quill assembly may be readily removed and replaced after the motor cartridge has been taken out of the main housing, simply by sliding same rearwardly through the housing. Thus, in case of damage to any part of the tool, which requires repair or replacement, the tool may be quickly disassembled and the replacement part inserted without requiring highly skilled attention or involving any substantial amount of time. The main parts of sub-assemblies, which must be carefully assembled and balanced to an accurate degree at the factory, need not be disturbed in making such replacements. Accordingly, the tool of the present invention is particularly adapted for repair in the field and does not necessitate the stoppage of the operation of the tool for prolonged periods of time.

Due to the thermal insulation and the arrangement for internal forced draft cooling of the metal shell, no part of the shell becomes uncomfortably warm to the hand even under heavy load. While the forced internal ventilation provided by the fan 102 prevents overheating of the tool, the ventilation cannot be sufficient to prevent heating of the heavily loaded armature of the motor. Accordingly, the armature assembly, the quill and the armature shaft are subject to axial thermal expansion during use. To accommodate axial thermal expansion, the bearing 110 at the rear end of the armature shaft is mounted for floating movement axially of the casing. The armature shaft and quill are held against endwise play by the quill bearings 26, 28 and 30 and the bearings are prestressed so that the lead bearing 26 absorbs most of the axial thrust without being subject to end play.

The tool shown in Figure 1 is particularly adapted for heavy duty work wherein considerable lateral thrust is exerted upon the quill 34. Accordingly, the quill 34 is provided with a plurality of bearings adapted to maintain the quill in aligned and balanced relationship and adapted to resist lateral thrust.

By providing coupling means of the present invention between the quill and armature shaft, the forward end of the armature need not be supported by a bearing, since the forward end thereof is locked to and accurately aligned with the quill 34 and is adapted to be supported by the quill supporting bearings. This feature of the present invention constitutes a substantial advantage since it was previously regarded as essential to provide a separate bearing for the support of the forward end of the armature shaft. By eliminating the extra bearing and by providing a compact coupling, the present invention also provides for a reduction in the length of the tool housing and complete assembly. Due to the nature of the connecting means or coupling of the present invention, the tool has substantially increased rigidity over prior tools and is not subject to chatter or the occurrence of backlash. By eliminating backlash and providing a high degree of rigidity, the present invention provides for the formation of precision work finishes.

In view of the foregoing, it will be appreciated that the present invention, as exemplified by the embodiment thereof disclosed in Figure 1, provides substantial advantages over previously proposed tools of the general character.

Referring now to Figure 3, the rotatable portions of the motor tool shown in Figure 1 are shown in exploded view, the rotary portions of the quill assembly being indicated generally at X, the permanently assembled rotary elements of the armature being indicated at Y and the removable portions of the rotary armature assembly being indicated at Z, the view showing the various rotary units in exploded view so as to clearly show the relationship thereof. Referring particularly to the tapered or frusto-conical counterbore or portions 98 of the hollow armature shaft 96 and to the tapered or frusto-conical portion 100 at the end of the quill 34, it will be appreciated that these portions of the two shafts should be accurately machined to provide for accurate alignment and positive connection between the quill and the armature shaft. To provide a positive interlock between the two shafts, the taper thereof is preferably relatively slight, but is not critical. As shown in the drawings, the taper may suitably be of the order of an included angle at the center line of approximately 16°. The two surfaces are preferably machined to substantially absolute accuracy, preferably to one minute of arc. Accordingly, a positive connection and accurate and absolute alignment of the rotary quill unit and the rotary armature unit are insured. While this coupling is particularly adapted for use in motor tools of the general character referred to herein, it will be appreciated that the coupling may be utilized in other types of machinery wherein accurate alignment and driving connection between two shafts is required. While the provision of the counterbore in the armature shaft and the provision of a head on the quill shaft has been shown herein as preferable, it will be appreciated that the relationship may be reversed and that other modifications may be made therein.

When assembled, the connecting means, comprising the stud 128 and the nut 132, exert a compressive force on the armature shaft between the frusto-conical portions 98 and 100 and the opposite or rear end of the armature shaft. Accordingly, the armature shaft 96 is jammed onto the quill 34. The taper of the two portions insures accurate alignment and positive driving connection between the two shafts. The connecting means shown and described herein are preferred means, but other types of connectors may suitably be substituted therefor.

A second embodiment of the motor tool of the present invention, utilizing the coupling means of the present invention, is shown in Figure 2. The motor tool shown in Figure 2 is adapted for work of a less strenuous nature than that for which the tool shown in Figure 1 is adapted. In particular, the heavy set of quill bearings is omitted in the embodiment of the invention shown in Figure 2 which leads to a more economical construction and assembly of the motor tool. Referring now to the drawing, the Figure 2 embodiment of the present invention comprises generally a plurality of main parts or subassemblies, namely, a quill assembly M, a main housing N, a motor carriage P, which is adapted to be telescoped inside the housing N, a locking ring R and a switch housing assembly S. The main housing element N is preferably a metal casting having a main cylindrical bore 150 presenting a shoulder 152 within the housing N which serves as a stop for the location of the motor cartridge P. The housing N may be formed of steel or a like metal, but is preferably formed of a light metal, such as an alloy of aluminum. The outside surface of the housing may be provided with corrugations consisting of spaced groups of circumferential beads or rings, as indicated at 154, disposed at suitable portions of the outside surface for convenience in gripping the tool and for facilitating the dissipation of heat. The main housing N has a neck portion 156 and is provided between the neck portion 156 and the main bore 150 with a plurality of longitudinal bores 158 establishing communication between atmosphere and the bore 150 in the body N. The neck portion 156 is provided with an axial bore 160 adapted for the reception of the quill assembly M.

The quill assembly M comprises a quill 200, front and rear bearings 202 and 204, respectively, and front and rear slingers 206 and 208, respectively. The bearings 202 and 204 are each received within separate pockets provided in the neck 156 of the main housing M. The bearing 202 is held in the neck of the housing by means of a clamping ring 210 threaded into the open end of the neck 156. The clamping ring 210 and the front slinger 206 have oppositely disposed and cooperating flange portions, indicated generally at 212, forming a centrifugal seal for the bearing 202. The front bearing 202 and the front slinger 206 are secured to the quill 200 between a shoulder 214 provided on the quill and a nut 216 threaded to the quill and engaging the inner race of the bearing 202. The inner ring portion of the front slinger 206 engages the opposite side of the inner race of the bearing 202 and the outer race of the bearing is confined between a shoulder 218 provided in the neck 156 of the housing N and the clamping ring 210 to lock the quill against endwise movement. The rear bearing 204 is held in place within the neck of the housing by confining the outer race thereof between a shoulder 220 provided in the neck and a clamping ring 222 threaded into an axial flange 224 provided on the neck 156 within the main portion of the housing N. The inner race of the bearing 204 is freely mounted on a sleeve 226 which is received on the quill 200 so that the quill 200 may be mounted for free floating axial movement with respect to the bearing 204. The sleeve 226 comprises a spacer between a shoulder 228 provided on the quill and an inner sleeve portion of the rear slinger 208. The rear slinger 208 and the clamping ring 222 have oppositely disposed cooperating flange portions 230 providing a centrifugal seal for the bearing 204. The rear slinger 208 is held in abutting relation to the sleeve 226 by means of a nut 232 threaded to the quill 200. The quill 200 is preferably tapered at its inner end to provide a head portion 234 and is provided with a tapped axial bore in substantially the same manner and for the same purpose as the quill 34 of the embodiment of the invention described hereinbefore.

To completely eliminate end play, the bearings 202 and 204 are prefearbly pre-stressed by means of a spring 235 confined between the inner race of the bearing 204 and the slinger 208. The spring 235 maintains an offsetting force on the inner races of the bearings 202 and 204 with respect to the outer races thereof to avoid end play within the bearings. Due to the resilient nature thereof, the spring 235 maintains a uniform offsetting force on the bearings regardless of expansion and contraction of the housing, the quill and the motor.

To assemble the quill within the housing, the bearings 202 and 204 are secured within their respective pockets by means of the retaining or clamping rings 210 and 222, respectively. The slinger 206 is slid onto the quill 200 and the quill is then slid into the neck of the main housing N from the front end thereof until the ring portion of the slinger 206 engages the inner race of the bearing 202. The nut 216 is then threaded onto the quill and is tightened into firm engagement with the inner race of the bearing 202. The sleeve 226 is then slid onto the quill until the edge thereof engages the shoulder 228 provided on the quill. The spring 235 is then inserted and confined between the inner race of the bearing 204 and the slinger 208 which is slid onto the quill 200 and secured thereto by threading the nut 232 onto the quill.

The motor cartridge P is substantially identical to the motor cartridge C described hereinbefore and is provided with a hollow armature shaft 236 having a socket or a tapered counterbore 238 at the forward end thereof for the reception of the head or tapered end portion 234 of the quill 200. The motor cartridge P includes a fan assembly 240, which in the present embodiment of the invention is stamped from sheet metal rather than being cast as was the fan 102 of the embodiment of the invention previously described. The fan assembly 240 is preferably formed from sheet steel and is not subject to creep or growth and, accordingly, is preferred for both embodiments of the tool disclosed herein. A balancing ring 242, of the character described hereinbefore, is press fit onto the hollow armature shaft 236 to assist in balancing the rotating elements of the motor cartridge. The rear end of the armature shaft 236 is supported by a ball bearing 244 and carries a rear slinger 246. The bearing 244 is freely mounted within a sleeve 248 to accommodate axial expansion and contraction of the shafts 200 and 236. The sleeve 248 cooperates with the slinger 246 to provide a centrifugal seal for the bearing 244. The sleeve 248 is mounted within a bearing block 260 which is adapted to be inserted within the housing N in abutting relation to the rear surface of the insulating shell of the motor cartridge and is adapted to be secured within the housing by means of a clamping ring R threaded into the open rear end of the main housing N. The rear end of the motor assembly is closed by means of a circular end plate 252 adapted to be secured to the housing by means of a plurality of bolts 254 passing through the end plate and threaded into the webs of the bearing block 250. The end plate 252 is provided with a central cap portion 256 adapted to fit within the rear portion of the sleeve 248 to seal the rear end of the bearing 244.

The end plate 252 is preferably circular in plan and is provided with rearwardly extending cap portions so that the end plate 252 comprises a bifurcated cap element. An aperture is provided in each of the bifurcated portions of the end cap 252 and is screened over, as is indicated at 258, to provide an air inlet for the motor tool. Accordingly, the end plate 252 is perforated so as to permit flow of air through the end plate to the interior of the motor.

The switch assembly S comprises an arcuate plate of relatively narrow width adapted to fit between the bifurcated portions of the end cap 252 and to close the open end thereof. The arcuate plate 262 of the switch assembly S is preferably secured to the end plate 252 by means of a pair of screws 264 extending through the arcuate plate 262 and threaded into an axially extending flange provided on the end plate 252. The arcuate plate 262 of the switch assembly S suitably carries a switch 266, a fuse 268 and a power cord 270. The connections between the electrical conductors of the power cord 270, the switch 266, the fuse 268, and the motor armature and motor field may be accomplished in any conventional manner. The switch and end plate assemblies of the two embodiments of the invention disclosed herein may be substituted for one another, if desired.

From the foregoing, it will be appreciated that the embodiment of the invention shown in Figure 2 comprises a somewhat more economical structure than does the embodiment of the invention shown in Figure 1. However, the embodiment of the invention shown in Figure 2 is not adapted for as strenuous use as is the embodiment of the invention shown in Figure 1. The motor cartridges C and P, utilized in each of the two embodiments of the invention may be identical, if desired, so that a common replacement cartridge may be utilized for both types of tools. As in the embodiment shown in Figure 1, the embodiment of the invention shown in Figure 2 eliminates one of the bearings heretofore regarded as essential for the support of the forward end of the armature shaft and accommodates a shortening of the motor tool housing. It will be apparent, however, that a bearing may be provided at the forward end of the armature to eliminate or reduce the necessity for several quill bearings. The coupling means of the present invention is incorporated in the embodiment of the invention shown in Figure 2, so that the rotary elements of the motor cartridge may be positively connected and accurately aligned with the quill assembly M. Likewise, either the quill assembly or the motor cartridge may be readily removed from the tool housing to accommodate repair or replacement of any or all elements of the construction. While the particular relationship and assembly of the various parts of the tool and the coupling or connecting means is preferably as shown and described, it will be apparent that modifications may readily be made therein.

In operation of the embodiment of the invention shown in Figure 2, air will be drawn through the apertures 258 in the rear of the motor tool through the motor and over the surfaces thereof by the fan 240, the ventilating air being discharged through the longitudinal bores 158 provided in the forward end of the housing. The slingers 206, 208 and 246 provide seals for the various bearings of the assembly so that air will not be forced into the bearings by the fan 240. Axial expansion and contraction of the armature assembly and both shafts, due to heating, will be readily accommodated by the floating bearings 204 and 244, while endwise play is eliminated by the bearing 202 and the stressing spring 235.

In view of the foregoing, it will be appreciated that the present invention provides improved motor tools of the general character referred to herein and improved coupling means for positively connecting and accurately aligning a motor armature with a rotary quill assembly of the tool.

While I have described what I regard to be preferred embodiments of my invention, it will be apparent that various changes, rearrangements and modifications may be made therein without departing from the spirit and scope of the present invention, as defined by the appended claims.

I claim:

1. In an electric motor tool of the character described, a rotary quill assembly, said quill assembly including at least one bearing and a quill shaft rotatably supported thereby, a rotary armature assembly including a shaft, said shaft being disposed in end to end relation, one of said shafts having a tapered socket at one end thereof, the other of said shafts having a tapered end portion adapted to be positioned within said socket in intimate engagement with the walls thereof, said shafts having driving connection solely by means of said tapered socket and end portion, connecting means for drawing said tapered end portion into intimate and firm engagement in said socket, and a bearing supporting said armature shaft, said quill bearing holding said shafts against endwise play and being pre-stressed to eliminate endwise play.

2. In an electric motor tool of the character described, a rotary quill assembly, said quill assembly including a plurality of bearings and a quill rotatably supported by said bearings, a rotary armature assembly, said armature assembly including a shaft and a bearing rotatably supporting said shaft at a point spaced a substantial distance from said quill, said shafts being disposed in end to end relation and having interfitting tapered head and socket portions by means of which said shafts are detachably connected and by means solely of which said shafts are drivingly connected, the armature shaft being supported solely by said last named bearing and said quill, one of said quill bearings holding said quill and said armature shaft against endwise play, and resilient means exerting a uniform stress on said quill bearings to prestress the same and eliminate endwise play.

3. In an electric motor tool of the character described, a rotary unit comprising a dynamicaly balanced quill assembly and a separately balanced armature assembly adapted to be detachably secured to said quill assembly, said quill assembly including a shaft and said armature assembly including a hollow shaft, one of said shafts having a tapered socket at one end thereof and the other of said shafts having a tapered end portion the taper of which corresponds to the taper of said socket, said socket being adapted for the intimate reception of said tapered end portion, a stud to extend through said hollow shaft and be secured to said quill shaft, said armature assembly including a bearing rotatably supporting the free end of said hollow shaft, said bearing and said stud each having a portion extending beyond the said free end of said hollow shaft, a locating washer adapted to be slidably received on said stud and inserted in said last-named bearing, and fastening means adapted to be secured to the said extending portion of said stud to secure said washer and said bearing to said hollow shaft and to exert a compressive force on said hollow shaft to effect accurate alignment and positive connection between said shafts.

4. In an electric motor tool of the character described, an unitary housing having accurately formed concentric bores therein, a quill shaft in one bore at the forward end of the housing, an anti-friction bearing intimately and accurately positioned within said one bore at each end of the quill shaft accurately to locate and rotatably to support said quill shaft in said one bore in the housing, an armature shaft carrying an armature in a second bore at the rear end of said housing, said shafts being disposed in end to end relation, an anti-friction bearing intimately and accurately positioned within said second bore adjacent the rear end of the armature shaft accurately to locate and rotatably to support the rear end of said armature shaft in accurate axial alignment with said quill shaft, said shafts being connected at the adjacent ends thereof, one of said shafts having a conical head portion at the end thereof and the other of said shafts having a conical socket accurately and conformably to fit said head to connect said shaft in accurate axial alignment at the adjacent ends thereof, said shafts having driving connection solely by means of said head and socket, connecting means for drawing said head and socket firmly into engagement to constitute the quill shaft and the armature shaft mechanically a single integral member, and an end closure for the rear end of said housing, said housing, said bearings, and said head and socket accurately aligning said shafts for rotation about the same axis.

5. In an electric motor tool of the character described, a one-piece integral tubular housing, said tubular housing having an accurately formed concentric interior surface, a quill shaft in the housing, said quill shaft being separately and accurately balanced, an anti-friction bearing accurately positioned and intimately received within said housing adjacent the forward end thereof at each end of the quill shaft accurately to locate and rotatably to support said quill shaft axially within said housing, an armature shaft carrying an armature in said housing, said armature shaft and armature being accurately balanced as a unit separately of said quill shaft, said shafts being disposed in end-to-end relation in said housing, an anti-friction bearing accurately positioned and intimately received within said housing adjacent the rearward end thereof accurately to locate and rotatably to support the rear end of said armature shaft axially within said housing, said shafts being connected at the adjacent ends thereof, one of said shafts having a conical head portion at the end thereof and the other of said shafts having a conical socket accurately and conformably to fit said head to connect said shafts in accurate axial alignment axially within said housing at the adjacent ends thereof, said shafts having driving connection solely by means of said head and socket, and connecting means drawing said head and socket firmly into engagement to constitute the quill shaft and the armature shaft mechanically a single integral member, said housing, said bearings and said head and socket accurately aligning said shafts axially within said housing for rotation about the same axis.

6. In an electric motor tool of the character described, a tubular housing, a quill shaft in the housing, an anti-friction bearing at each end of the quill shaft to support it rotatably in the housing, an armature shaft carrying an armature in said housing, said shafts being disposed in end-to-end relation, an anti-friction bearing between the rear end of the housing and the armature shaft, said shafts being adapted for connection at the adjacent ends thereof, one of said shafts having a conical head portion at the end thereof and the other of said shafts having a conical socket adapted conformably to fit said head, said shafts having driving connection solely by means of said head and socket, and connecting means for drawing said head and socket firmly into engagement to constitute the quill shaft and the armature shaft mechanically a single integral member, at least one of the bearings of the quill holding the quill shaft against endwise play and at least the single bearing at the rear end of the armature shaft being mounted to accommodate endwise movement of said shaft with respect to said housing to take up the axial expansion and contraction of both of said shafts.

7. In an electric motor tool of the character described, a tubular housing, a quill shaft in the housing, an anti-friction bearing at each end of the quill shaft to support it rotatably in the housing, an armature shaft carrying an armature in said housing, said shafts being disposed in end-to-end relation, an anti-friction bearing between the rear end of the housing and the armature shaft, said shafts being adapted for connection at the adjacent ends thereof, one of said shafts having a conical head portion at the end thereof and the other of said shafts having a conical socket adapted conformably to fit said head, said shafts having driving connection solely by means of said head and socket, and connecting means for drawing said head and socket firmly into engagement to constitute the quill shaft and the armature shaft mechanically a single integral member, at least one of the bearings of the quill holding the quill shaft against endwise play and at least the single bearing at the rear end of the armature shaft being mounted to accommodate endwise movement of said shaft with respect to said housing to take up the axial expansion and contraction of both of said shafts, at least said one bearing being prestressed to hold said shafts against end play.

8. In an electric motor tool of the character described, a one-piece integral tubular housing, said tubular housing having an accurately formed concentric interior surface, a quill in the housing, said quill being separately and accurately balanced, an anti-friction bearing accurately positioned and intimately received within said housing adjacent the forward end thereof at each end of the quill accurately to locate and rotatably to support said quill axially within said housing, the inner end of the quill being conical and having a threaded axial socket, an armature shaft carrying an armature in said housing, said armature shaft and armature being accurately balanced as a unit separately of said quill, said quill and said armature shaft being disposed in end-to-end relation in said housing, an anti-friction bearing accurately positioned and intimately received within said housing adjacent the rearward end thereof accurately to locate and rotatably to support the rear end of said armature shaft axially within said housing, said armature shaft having at its forward end a tapered socket accurately and conformably to fit said conical end of said quill, said quill and said armature shaft having driving connection solely by means of said socket and said conical end, said armature shaft having an axial bore, and a draw bolt threaded into the axial socket in the end of said quill and extending through said axial bore for drawing said conical end of said quill and said socket firmly into engagement to connect said quill and said armature shaft in accurate axial alignment axially within said housing at the adjacent ends thereof and to constitute the quill and the armature shaft mechanically a single integral member, said armature shaft being supported solely by said last-named bearing and said quill, said housing, said bearings, said conical end of said quill and said socket accurately aligning said quill and said armature shaft axially within said housing for rotation about the same axis, said draw bolt being located along said last-named axis, whereby the same does not disturb the accurate balance of said quill and said armature shaft.

9. In an electric motor tool of the character described, a balanced rotary quill assembly, a separately balanced rotary armature assembly, said assemblies being positioned end to end adapted for rotation about a common axis, each of said assemblies including a shaft, one of said shafts having a tapered socket therein at the end thereof adjacent the other of said shafts, the said other of said shafts having a head portion conformable to said socket at the end thereof adjacent said one shaft, said socket being adapted for the intimate and conformable reception of said head portion, said shafts having driving connection solely by means of said head and socket, and means for securing said head portion in said socket to constitute said shafts mechanically a single integral balanced member, said quill assembly including a plurality of bearings rotatably supporting the quill shaft, at least one of said bearings being prestressed and holding said shafts against endwise play, said armature assembly including a single bearing adapted to rotatably and slidably support the free end of the armature shaft.

10. In an electric motor tool of the character described, a tubular housing, shaft means rotatably supported in said housing, at least one bearing in said housing adjacent the forward end thereof rotatably supporting the forward end of said shaft means, and a second bearing slidably mounted in said housing adjacent the rear end thereof rotatably supporting the rear end of said shaft means, the bearing at the forward end of the housing holding said shaft means against endwise movement, said slidable bearing accommodating endwise movement of said shaft means with respect to said housing to take up relative axial expansion and contraction of said shaft means, at least said bearing at the forward end of the housing being prestressed to hold said shaft means against end play.

11. In an electric motor tool of the character described, a tubular housing, shaft means rotatably supported in said housing, at least one bearing in said housing adjacent the forward end thereof rotatably supporting the forward end of said shaft means, a second bearing slidably mounted in said housing adjacent the rear end thereof rotatably supporting the rear end of said shaft means, the bearing at the forward end of the housing holding said shaft means against endwise movement, said slidable bearing accommodating endwise movement of said shaft means with respect to said housing to take up relative axial expansion and contraction of said shaft means, at least said bearing at the forward end of the housing being prestressed to hold said shaft means against end play, at least the rearward portion of said shaft means being hollow, a stud extending into said hollow portion of said shaft means and operatively associated with said shaft means, said slidable bearing and said stud each having a portion extending beyond the rear end of said shaft means, and a locating washer slidably received on said stud and inserted in said last-named bearing, said stud securing said washer and said bearing on said shaft means and exerting a compressive force on said washer, said bearing and said shaft means.

(References on following page)

References Cited in the file of this patent

UNITED STATES PATENTS

| Number | Name | Date |
|---|---|---|
| 876,368 | Macfarlane | Jan. 14, 1908 |
| 1,241,659 | Ritz | Oct. 2, 1917 |
| 1,880,936 | Else | Oct. 4, 1932 |
| 2,053,056 | Whiteside | Sept. 1, 1936 |
| 2,138,531 | Wise et al. | Nov. 29, 1938 |
| 2,170,036 | Schumann | Aug. 22, 1939 |
| 2,297,988 | Sawyer | Oct. 6, 1942 |
| 2,364,599 | Burrus | Dec. 12, 1944 |
| 2,452,268 | Schumann | Oct. 26, 1948 |
| 2,476,515 | Stevens | July 19, 1949 |
| 2,532,823 | Schumann | Dec. 5, 1950 |